US010561133B2

(12) United States Patent
Martin

(10) Patent No.: US 10,561,133 B2
(45) Date of Patent: Feb. 18, 2020

(54) MODULAR FLY BOX SYSTEM

(71) Applicant: Elliot Hanohano Waikwok Martin, Canon City, CO (US)

(72) Inventor: Elliot Hanohano Waikwok Martin, Canon City, CO (US)

( * ) Notice: Subject to any disclaimer, the term of this patent is extended or adjusted under 35 U.S.C. 154(b) by 316 days.

(21) Appl. No.: 15/591,657

(22) Filed: May 10, 2017

(65) Prior Publication Data

US 2017/0325441 A1 Nov. 16, 2017

Related U.S. Application Data

(60) Provisional application No. 62/334,766, filed on May 11, 2016.

(51) Int. Cl.
*B65D 25/10* (2006.01)
*B65D 43/16* (2006.01)
*B65D 43/22* (2006.01)
*A01K 97/06* (2006.01)

(52) U.S. Cl.
CPC .............. *A01K 97/06* (2013.01); *B65D 25/10* (2013.01); *B65D 43/165* (2013.01); *B65D 43/22* (2013.01)

(58) Field of Classification Search
CPC .... B65D 25/10; B65D 25/101; B65D 25/102; B65D 25/103; B65D 25/105; B65D 25/106; B65D 25/107; B65D 25/108; B65D 43/22; B65D 43/165
USPC ...... 206/6.1, 315.11, 566; 224/920; 43/54.1, 43/57.1, 57.2
See application file for complete search history.

(56) References Cited

U.S. PATENT DOCUMENTS

| 485,582 A | * | 11/1892 | Howe | A01K 97/06 43/57.1 |
| 891,055 A | | 6/1908 | Frost | |
| 1,133,846 A | * | 3/1915 | Fath | A01K 97/06 43/57.2 |

(Continued)

FOREIGN PATENT DOCUMENTS

NZ 613464 D 1/1898

OTHER PUBLICATIONS

Webpage—http://www.cliffoutdoors.com/index.php?page=the-deuce, US Cliff Outdoors, Casper WY., Aug. 2011—Nov. 2013.

(Continued)

*Primary Examiner* — Joshua E Rodden
(74) *Attorney, Agent, or Firm* — Aaron Swehla

(57) ABSTRACT

A storage system to retain fishing flies and fishing rigs may include a multi-piece enclosure with a first storage compartment pivotally interconnected with a second storage compartment. A composite sheet assembly may be attachable to the multi-piece enclosure and may be sized to fit within the multi-piece enclosure when attached to the multi-piece enclosure and when a first edge portion of the first storage compartment and a second edge portion of the second storage compartment are positioned against one another. The composite sheet assembly may include a first sheet, with a slit system including a plurality of slits in the first sheet, that is configured to retain fishing hooks. The composite sheet assembly may further include a notched edge including a first set of one or more notches to receive portions of rig lines when the rig lines are wrapped around the composite sheet assembly.

18 Claims, 12 Drawing Sheets

(56) References Cited

U.S. PATENT DOCUMENTS

| | | | | |
|---|---|---|---|---|
| 1,490,370 A * | 4/1924 | Figley | ............... | A01K 97/06 |
| | | | | 43/57.2 |
| 1,749,227 A * | 3/1930 | Pruett | ............... | A01K 97/06 |
| | | | | 43/57.2 |
| 1,954,127 A * | 4/1934 | Harsted | ............... | A01K 97/06 |
| | | | | 43/57.1 |
| 1,993,144 A * | 3/1935 | Kasdan | ............... | A01K 97/06 |
| | | | | 43/57.1 |
| 2,125,856 A * | 8/1938 | De Witt | ............... | B65D 25/04 |
| | | | | 206/819 |
| 2,173,363 A | 9/1939 | Hillmer | | |
| 2,497,188 A | 2/1950 | Schindler | | |
| 2,558,124 A * | 6/1951 | Burden | ............... | A01K 97/06 |
| | | | | 220/520 |
| 2,629,963 A | 3/1953 | Youker | | |
| 2,629,964 A | 3/1953 | Thunell | | |
| 2,658,300 A | 11/1953 | Snyder | | |
| 2,804,717 A | 9/1957 | Ripperdan | | |
| 3,507,071 A | 4/1970 | Bryson | | |
| 4,073,085 A | 2/1978 | Stremeckus | | |
| 4,176,491 A | 12/1979 | Herring | | |
| 4,248,004 A | 2/1981 | Trotter | | |
| 4,742,640 A | 5/1988 | Moore | | |
| 4,924,621 A | 5/1990 | Hawranik et al. | | |
| 4,977,700 A | 12/1990 | Perlman et al. | | |
| 5,018,298 A | 5/1991 | Spears | | |
| 5,526,927 A * | 6/1996 | McLemore | ............... | A01K 97/06 |
| | | | | 206/315.11 |
| 5,606,820 A * | 3/1997 | Suddeth | ............... | A01K 97/06 |
| | | | | 206/315.11 |
| 5,638,957 A * | 6/1997 | Brasier | ............... | A61F 13/551 |
| | | | | 206/581 |
| 5,829,185 A * | 11/1998 | Myers | ............... | A01K 97/06 |
| | | | | 43/57.1 |
| 6,079,148 A * | 6/2000 | Yonenoi | ............... | A01K 97/06 |
| | | | | 43/57.1 |
| 6,219,958 B1 | 4/2001 | Eberts | | |
| 6,763,632 B1 | 7/2004 | Exby | | |
| 6,962,020 B2 | 11/2005 | Gonzalez | | |
| 7,788,844 B1 | 9/2010 | Ruzicka | | |
| 7,997,024 B2 | 8/2011 | Gesik | | |
| D696,348 S * | 12/2013 | Dilker | ............... | D19/113 |
| 9,320,267 B2 | 4/2016 | Smith | | |
| 9,913,463 B2 * | 3/2018 | Aston | ............... | A01K 97/06 |
| 2005/0279012 A1 * | 12/2005 | Wieringa | ............... | A01K 97/06 |
| | | | | 43/54.1 |
| 2009/0044442 A1 * | 2/2009 | Ryckman | ............... | A01K 97/06 |
| | | | | 43/54.1 |
| 2009/0119974 A1 * | 5/2009 | Rieux | ............... | A01K 97/06 |
| | | | | 43/54.1 |
| 2015/0047249 A1 | 2/2015 | Smith | | |
| 2016/0015017 A1 * | 1/2016 | Heaton | ............... | A01K 97/06 |
| | | | | 43/54.1 |

OTHER PUBLICATIONS

Webpage—http://www.basspro.com/Lindy-Rigger-Snell-Holder/product/72799/, BassPro Shops, San Jose, CA, Oct. 2011—Aug. 2014.

Webpage—http://www.orvis.com/p/dropper-rig-fly-box/76KH, The Orvis Company, Feb. 2015-Apr. 2017.

Webpage—http://www.smithcreek.co/rig-keeper.php, Smith Creek, New Zealand, Oct. 2015-Oct. 2018.

* cited by examiner

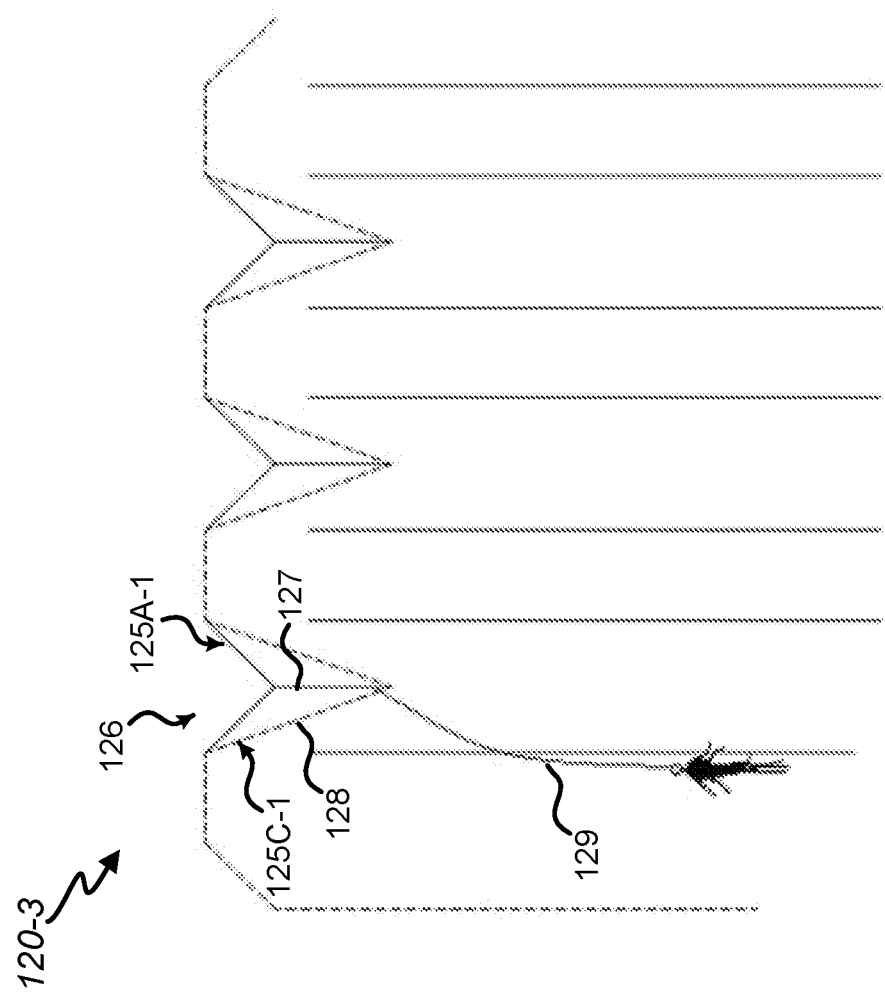

MODULAR FLY BOX SYSTEM

CROSS-REFERENCES TO RELATED APPLICATIONS

This Application claims priority to U.S. Provisional Patent Application No. 62/334,766, filed May 11, 2016, entitled "MODULAR FLY BOX SYSTEM," the entire disclosure of which is hereby incorporated by reference, for all purposes, as if fully set forth herein.

BACKGROUND

Certain embodiments of the present disclosure relate generally to fishing equipment and in particular to modular fly box systems.

Oftentimes, a need for certain types of flies and rigs varies with the different habitats and the fluctuations in weather and water conditions that an angler encounters. It is common for anglers to move frequently in the course of a day in order to cover more water and increase the chances of catching more fish. Thus, it may be necessary to use different flies and rigs for the differing conditions that they encounter as they move. Within the course of just one day, an angler may change flies and/or rigs many different times as they try to adjust to different situations. Bringing a full range of flies and rigs to accommodate different conditions can be cumbersome. Additionally, tying up rigs is time consuming, and storing these rigs can be difficult. Furthermore, retooling a fly box for different outings on different bodies of water is also very time-consuming.

There is a need for systems and methods for improved modular fly box systems. This and other needs are addressed by the present disclosure.

BRIEF SUMMARY

Certain embodiments of the present disclosure relate generally to fishing equipment and in particular to modular fly box systems.

In one aspect, a storage system to retain fishing flies and fishing rigs is disclosed. The storage system may include any one or combination of the following. A multi-piece enclosure may include a first storage compartment pivotally interconnected with a second storage compartment. A composite sheet assembly may be attachable to the multi-piece enclosure. The composite sheet assembly may be sized to fit within the multi-piece enclosure when attached to the multi-piece enclosure and when a first edge portion of the first storage compartment and a second edge portion of the second storage compartment are positioned against one another. The composite sheet assembly may include a first sheet attached to a second sheet. The first sheet may include a slit system including a plurality of slits in the first sheet and configured to retain fishing hooks in the plurality of slits. The composite sheet assembly may further include a notched edge including a first set of one or more notches to receive portions of rig lines when the rig lines are wrapped at least partially around the composite sheet assembly.

In various embodiments, a quick-release fastener may be pivotally interconnected with the first storage compartment and the second storage compartment. The composite sheet assembly may be attachable to the multi-piece enclosure via the quick-release fastener. The composite sheet assembly may be sized to fit within the multi-piece enclosure when attached to the multi-piece enclosure via the quick-release fastener.

In various embodiments, the composite sheet assembly may further include a third sheet attached to the second sheet. The third sheet may include a second slit system that includes a second plurality of slits in the third sheet and that is configured to retain fishing hooks in the second plurality of slits. The second sheet may add a structural integrity to the composite sheet assembly at least in part by reinforcing the first sheet and the third sheet. The second sheet may further at least mitigate tearing of the first sheet and the third sheet.

In various embodiments, the first sheet may be configured to retain fishing hooks at least in part with forces imparted on the fishing hooks by the plurality of slits. In various embodiments, at least a portion of the second sheet may include magnetic material. The magnetic material may at least partially facilitate retaining of the fishing hooks in the plurality of slits.

In various embodiments, one or more magnetic members may be disposed proximately to the plurality of slits. The one or more magnetic members may be to at least partially facilitate retaining of the fishing hooks in the plurality of slits. In various embodiments, the slit system may include a second plurality of slits, each slit of the second plurality of slits extending from a respective notch so that the respective notch corresponds to a slitted notch adapted to direct a fly of a first rig line of the rig lines to a slit of the plurality of slits.

In another aspect, a storage system to retain fishing flies and fishing rigs is disclosed. The storage system may include any one or combination of the following. A multi-piece enclosure may include a first storage compartment pivotally interconnected with a second storage compartment. A quick-release fastener may be pivotally interconnected with the first storage compartment and the second storage compartment. A middle page may be attachable to the multi-piece enclosure via the quick-release fastener. The middle page may be sized to fit within the multi-piece enclosure when attached via the quick-release fastener and when a first edge portion of the first storage compartment and a second edge portion of the second storage compartment are positioned against one another. The middle page may be configured to receive and retain fishing hooks. The middle page may further include a notched edge including a first set of one or more notches to receive portions of rig lines when the rig lines are wrapped at least partially around the middle page.

In various embodiments, the middle page may include a slit system including a plurality of slits and configured to retain fishing hooks in the plurality of slits. In various embodiments, the quick-release fastener may correspond to a snap clip, a magnetic fastener, a press fit fastener, or a hook and loop fastener. In various embodiments, the storage system may further include a retractable cable mechanism that includes a reel and a cable, with the cable attached to the reel and the middle page.

In various embodiments, the slit system may include a second plurality of slits. Each slit of the second plurality of slits may extend from a respective notch so that the respective notch corresponds to a slitted notch adapted to direct a fly of a first rig line of the rig lines to a slit of the plurality of slits. In various embodiments, the middle page may include a composite sheet assembly. The composite sheet assembly may include a first sheet attached to a second sheet. The first sheet may include the slit system.

In various embodiments, the storage system may further include a second quick-release fastener pivotally interconnected with the first storage compartment and the second storage compartment. The storage system may further include a second middle page attachable to the multi-piece enclosure via the second quick-release fastener. The second middle page may be sized to fit within the multi-piece enclosure when attached via the second quick-release fastener and when the first edge portion of the first storage compartment and the second edge portion of the second storage compartment are positioned against one another. The second middle page may include a second slit system comprising a second plurality of slits in the second sheet and configured to retain fishing hooks in the second plurality of slits. The second middle page may include a second notched edge including a second set of one or more notches to receive portions of rig lines when the rig lines are wrapped at least partially around the second middle page.

In various embodiments, the middle page with the quick-release fastener and the second middle page with the second quick-release fastener may be configured to be coaxially rotatable about an axis of a hinge assembly. In various embodiments, the middle page and the second middle page may be rotatable to be positioned along a common plane. In various embodiments, the slit system may be configured to retain fishing hooks at least in part with forces imparted on the fishing hooks by the plurality of slits. In various embodiments, at least a portion of the middle page may include magnetic material. The magnetic material may at least partially facilitate retaining of the fishing hooks in the plurality of slits. In various embodiments, the storage system may further include one or more magnetic members disposed proximately to the plurality of slits. The one or more magnetic members may be to at least partially facilitate retaining of the fishing hooks in the plurality of slits.

In yet another aspect, a method for forming a storage system to retain fishing flies and fishing rigs is disclosed. The method may include any one or combination of the following. A first storage compartment may be interconnected with a second storage compartment to provide a multi-piece enclosure. A quick-release fastener may be interconnected with the first storage compartment and the second storage compartment. A middle page may be attached to the multi-piece enclosure via the quick-release fastener. The middle page may be sized to fit within the multi-piece enclosure when attached via the quick-release fastener and when a first edge portion of the first storage compartment and a second edge portion of the second storage compartment are positioned against one another. The middle page may include a slit system including a plurality of slits in one or more sheets and configured to retain fishing hooks in the plurality of slits. The middle page may include a notched edge including a first set of one or more notches to receive portions of rig lines when the rig lines are wrapped at least partially around the middle page.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

FIG. 3C depicts a close-up partial view of a middle page, in accordance with certain embodiments of the present disclosure.

FIG. 3D depicts an example of tearing that may potentially occur with some less resilient exterior sheet materials, absent the middle sheet, if the rig is wrapped tightly around the around the middle page.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Certain embodiments according to the present disclosure may provide for a fly box configured to store flies and fly rigs. A rig may include one or more segments of tippet, each segment attached to one or more flies. It is very common for fly fishers to use two-fly rigs. Yet, rigs with different numbers of flies may also be used. The fly box may be configured to include one or more detachable middle pages. The one or more detachable middle pages may each be configured to hold multiple fly rigs. Multiple detachable middle pages may each be rigged up differently, for example, to accommodate particular needs for certain types of flies and rigs appropriate for different ecosystems and conditions that an angler encounters. One or more appropriately rigged detachable middle pages may be selected and snapped into the fly box to quickly equip the angler for a particular outing.

Certain embodiments may provide a multi-page fly box. Some embodiments of a multi-page fly box may be configured for a tandem middle page configuration accommodated by an elongated box. Some embodiments of a multi-page fly box may be configured for a side-by-side middle page configuration accommodated by a deeper box. Further, certain embodiments may provide a fly box system with one or more extendable middle pages.

Various embodiments will now be discussed in greater detail with reference to the accompanying figures, beginning with FIG. 1A.

Figure 1A:
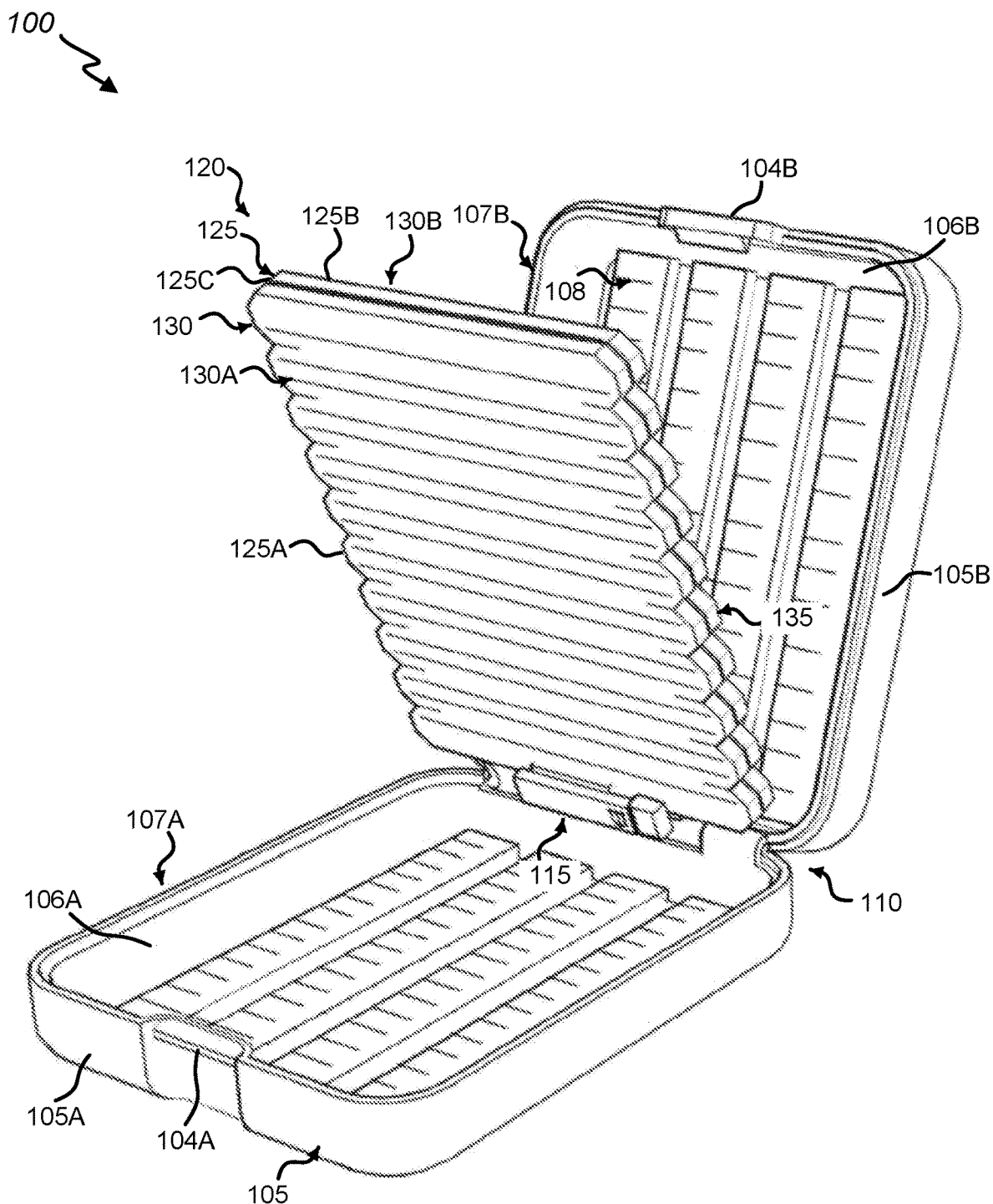
FIG. 1A depicts a perspective view of a fly box system in an open state, in accordance with certain embodiments of the present disclosure.
Figure 1B:
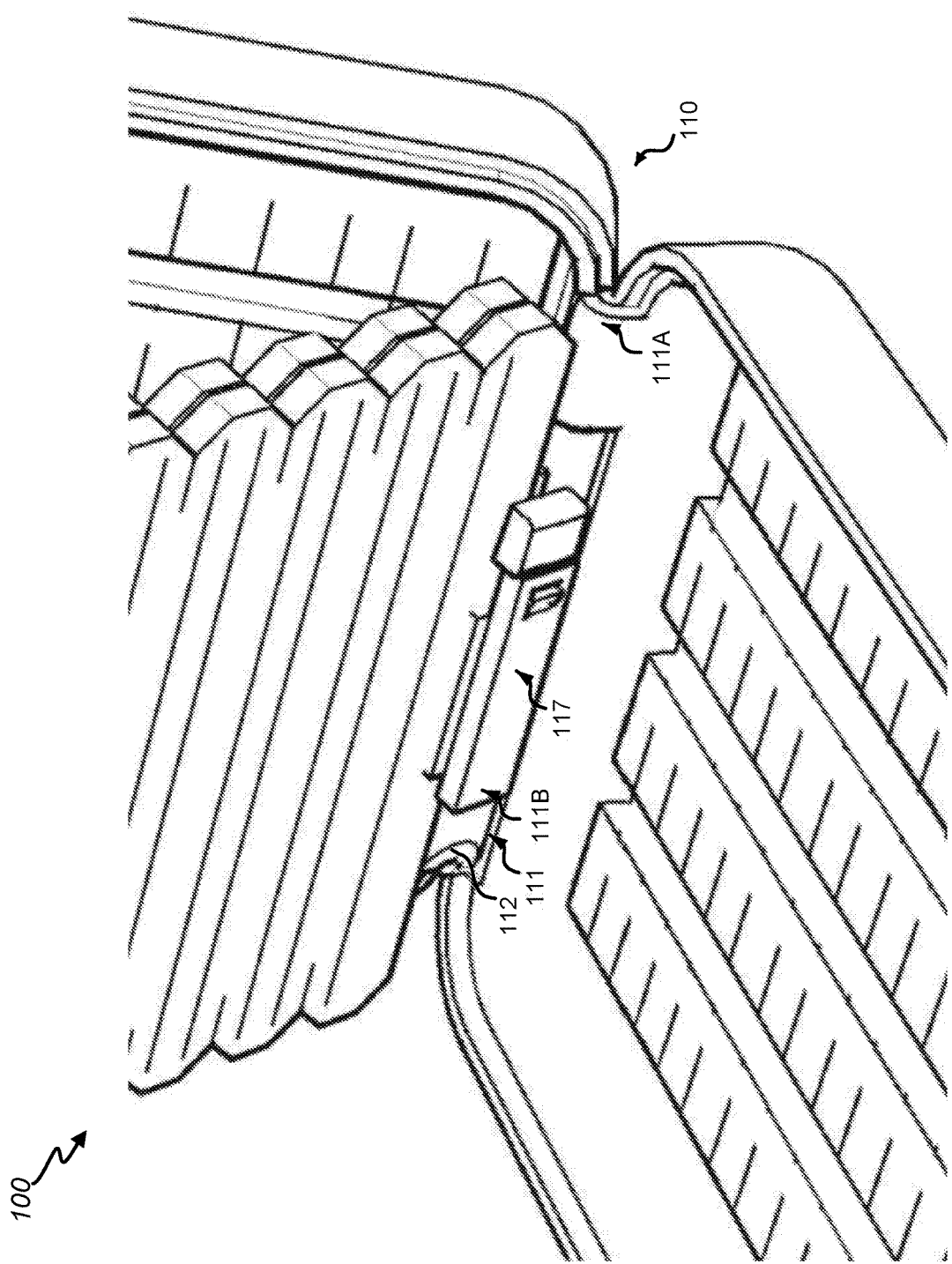
FIG. 1B depicts a close-up view of aspects of the fly box system, in accordance with certain embodiments of the present disclosure.
Figure 2:
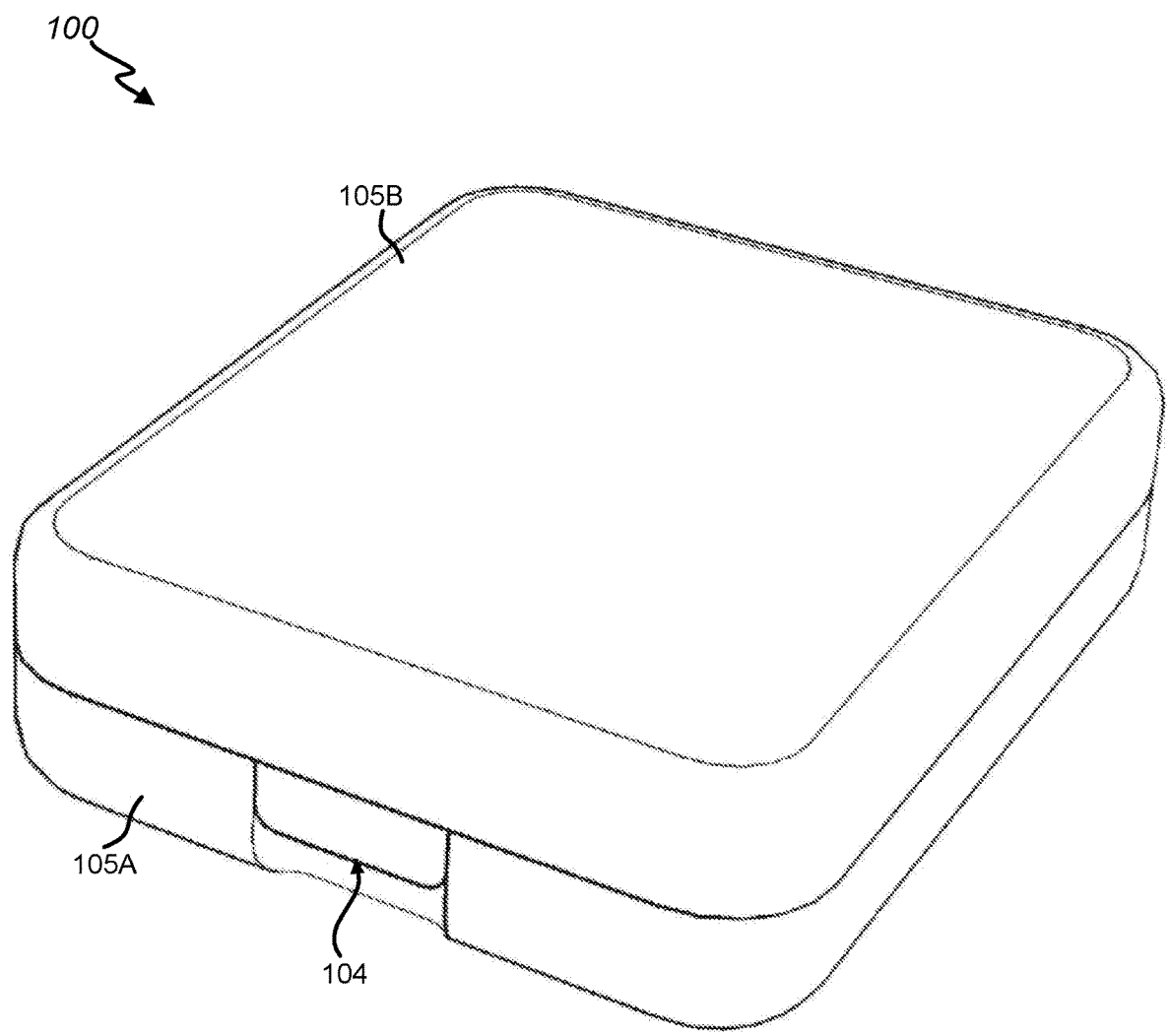
FIG. 2 depicts a perspective view of the fly box system in a closed state, in accordance with certain embodiments of the present disclosure.

FIG. 1A depicts a perspective view of a fly box system 100 in an open state, in accordance with certain embodiments of the present disclosure. FIG. 1B depicts a close-up view of aspects of the fly box system 100 in the open state, in accordance with certain embodiments of the present disclosure. FIG. 2 depicts a perspective view of the fly box system 100-1 in a closed state, in accordance with certain embodiments of the present disclosure. The fly box system 100 may correspond to a storage system configured to retain fishing flies and fishing rigs, to allow easy access to flies and fishing rigs, and to allow quick customization of flies and fishing rigs. The fly box system 100 may include a multi-piece enclosure 105. The multi-piece enclosure 105 may include a first storage compartment 105A and a second storage compartment 105B. In some embodiments, the first storage compartment 105A and the second storage compartment 105B may be pivotally interconnected. By way of example without limitation, the first storage compartment 105A and the second storage compartment 105B may be pivotally interconnected via a hinge assembly 110.

Figure 1C:
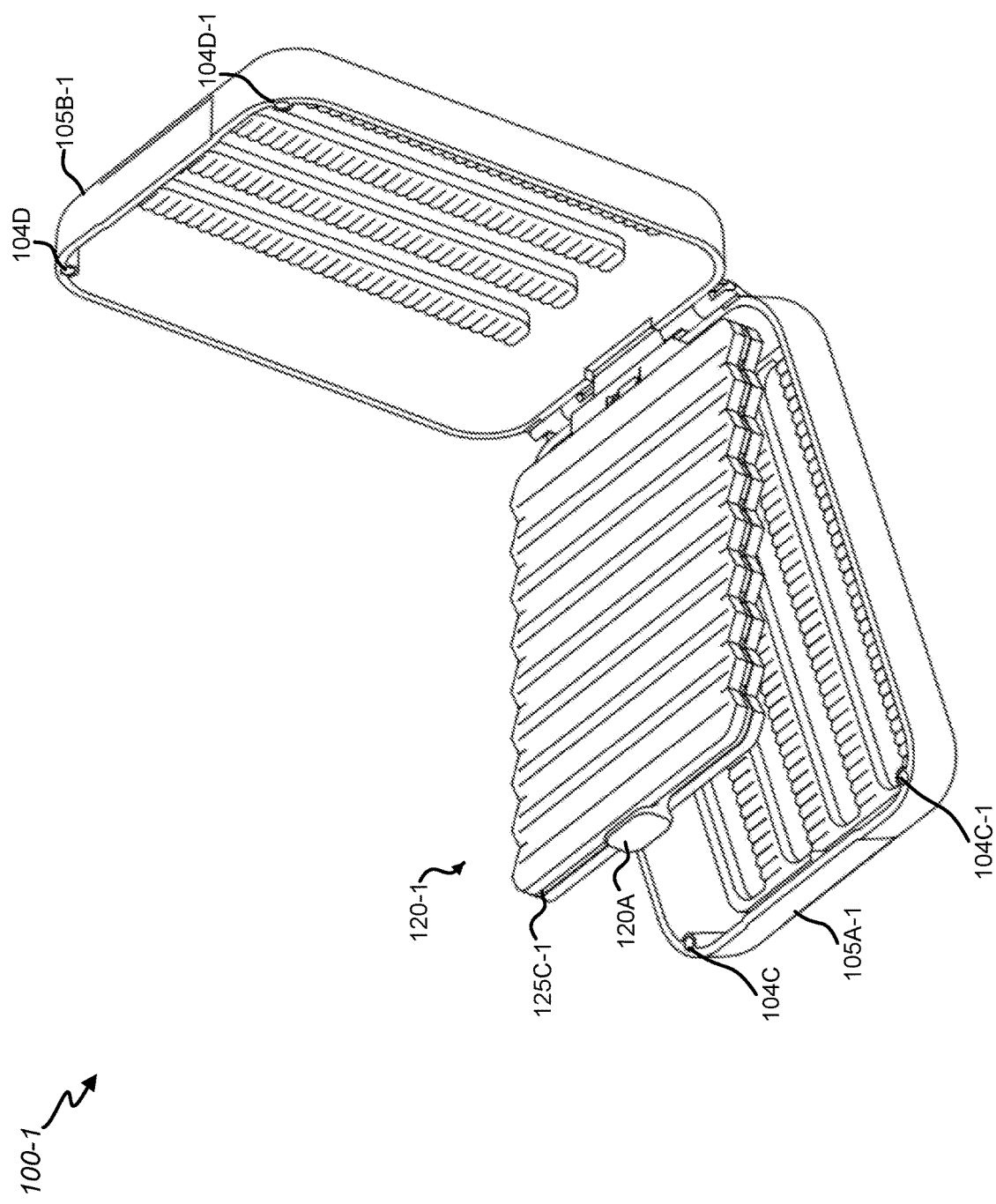
FIG. 1C depicts a perspective view of a fly box system in an open state, in accordance with certain embodiments of the present disclosure.

The multi-piece enclosure 105 may include a snap latch assembly 104 with mating portions 104A, 104B configured to releasably latch the first storage compartment 105A and the second storage compartment 105B together. FIG. 1C depicts a perspective view of a fly box system 100-1 in an open state, in accordance with certain embodiments of the present disclosure. As depicted, the fly box system 100-1 may include magnetic latch components 104C, 104D configured to releasably latch the first storage compartment 105A and the second storage compartment 105B together. The magnetic latch components 104C, 104D may correspond to mating magnetic inserts and/or magnetic-ferromagnetic combinations of inserts. The inserts may be mounted into bosses of the first storage compartment 105A and the second storage compartment 105B.

Referring again more generally to FIGS. 1A and 1B, in various embodiments, the multi-piece enclosure 105, the first storage compartment 105A, and/or the second storage compartment 105B may be formed of any suitable material, such as a plastic material, such as a synthetic or semi-synthetic organic material, a nylon-based material, etc. sufficiently structurally sound to form a rigid or semi-rigid enclosure. With some embodiments, the multi-piece enclosure 105, the first storage compartment 105A, and/or the second storage compartment 105B may be formed of a transparent material. One or both of the first storage compartment 105A and the second storage compartment 105B may include a cavity 106A, 106B in various embodiments.

In some embodiments, the first storage compartment 105A, and/or the second storage compartment 105B may include one or more tackle holders 108. The tackle holders 108 may include racks, arrays, and/or the like fixedly attached to one or more interior surfaces of the first storage compartment 105A and/or the second storage compartment 105B. The racks, arrays, and/or the like may include holes, slits, etc. to receive and retain hooks of flies.

With certain embodiments, the fly box system 100 may include a quick-release fastener 115. The quick-release fastener 115 may, in some embodiments, be pivotally interconnected with the hinge assembly 110. Accordingly, in some embodiments, the quick-release fastener 115 may be pivotally interconnected with the first storage compartment 105A and the second storage compartment 105B.

As in the example depicted, the fly box system 100 may include a middle page 120. The middle page 120 may be pivotally interconnected with the multi-piece enclosure 105. In some embodiments, the middle page 120 may be pivotally interconnected with the multi-piece enclosure 105 via the quick-release fastener 115. Thus, the quick-release fastener 115 may allow the middle page 120 to be attachable and detachable from the multi-piece enclosure 105. According to some embodiments, the quick-release fastener 115 may correspond to any suitable fastener that allows the middle page 120 to be attachable and detachable from the multi-piece enclosure 105. Various embodiments of the quick-release fastener 115 may include a snap clip, a magnetic fastener, a ring clip, a snap button, a hook and loop fastener, and/or the like.

The hinge assembly 110 may include one or more sleeve segments 111. In some embodiments, a first subset 111A of the sleeve segments 111 may be integrally formed as part of the first storage compartment 105A, and a second subset 111B of the sleeve segments 111 may be integrally formed as part of the second storage compartment 105B. Accordingly, certain embodiments may provide for integrated hinge portions. Yet, in other embodiments, the hinge assembly 110 may be a separate assembly attached to the first storage compartment 105A and the second storage compartment 105B.

The sleeve segments 111 may correspond to tubular-shaped segments connected alternately. An elongated shaft 112 (a hinge pin 112) may extend coaxially within the aperture of sleeve segments 111 to create a tight fit with the sleeve segments 111 that allows for rotation of the sleeve segments 111. The hinge pin 112 may be made any suitable material (e.g., it may be a steel rod, in some embodiments).

Figure 5:
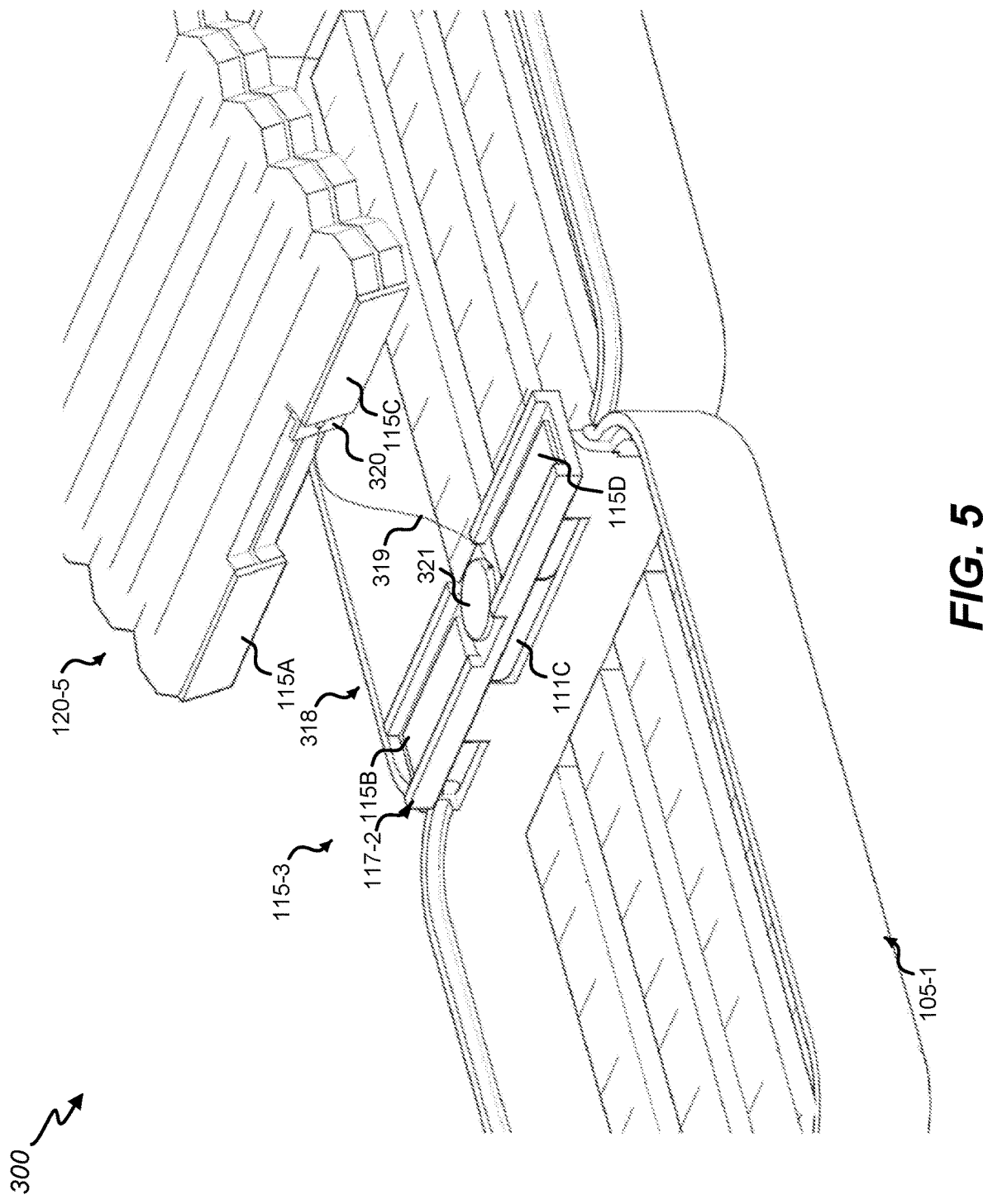
FIG. 5 depicts a perspective view of a fly box system with an extendable middle page, in accordance with certain embodiments of the present disclosure.

In certain embodiments, the quick-release fastener 115 may have one or more sleeve segments, integral with a channel component 117 or attached thereto, which are part of the alternately connected sleeve segments coupled to the hinge pin 112. While an example of such one or more sleeve segments of the channel component 117 is not viewable from the perspective of FIG. 1B, an example sleeve segment 111C is depicted in FIG. 5 that may be similarly included in embodiments according to FIG. 1B. Other alternative embodiments of the quick-release fastener 115 may have one or more sleeve segments, integral with the insertion component 116 or attached thereto, which are part of the alternately connected sleeve segments coupled to the hinge pin 112. Accordingly, the quick-release fastener 115 (and the middle page 120 when fastened with the quick-release fastener 115) may be rotatable about the axis of the hinge assembly 110. Some alternative embodiments of the one or more sleeve segments of the quick-release fastener 115 may be formed to snap onto other sleeve segments of the first storage compartment 105A or the second storage compartment 105B, rather than directly contacting the hinge pin 112. Other embodiments are possible.

The middle page 120, the first storage compartment 105A, and the second storage compartment 105B may be dimensioned so that the middle page 120 may fit within the multi-piece enclosure 105 when the middle page 120 is attached via the quick-release fastener 115 and when a first edge portion 107A of the first storage compartment 105A and a second edge portion 107B of the second storage compartment 105B are positioned against one another. Stated otherwise, when the attached middle page 120 may fit within the multi-piece enclosure 105 when the multi-piece enclosure 105 is closed, as depicted in the non-limiting example of FIG. 2.

In some embodiments, the multi-piece enclosure 105 may be configured to form a waterproof seal and/or an airtight seal when in the closed state. Various embodiments of the first storage compartment 105A and/or the second storage compartment 105B may include one or more seals about one or both rims of the first storage compartment 105A and the second storage compartment 105B. The seal(s) may include a tight-fit seal, a rubber seal, mating rubber seals, and/or the like in various embodiments.

Referring to the example of FIG. 1C, some embodiments may include a middle page 120-1 that includes a tab 120A. The tab 120A may be formed as a finger tab to facilitate manipulation of the middle page 120-1. In various embodiments, the tab 120A may be formed integrally with the middle page 120-1 (e.g., with a middle sheet 125C) or may be connected to the middle page 120-1. When the first storage compartment 105A and the second storage compartment 105B are closed together, the tab 120A may engage interior ledges of the storage compartments 105A, 105B so that the movement of the middle page 120-1 is limited or prevented in order to ensure proper positioning of the middle page 120-1.

Figure 3A:
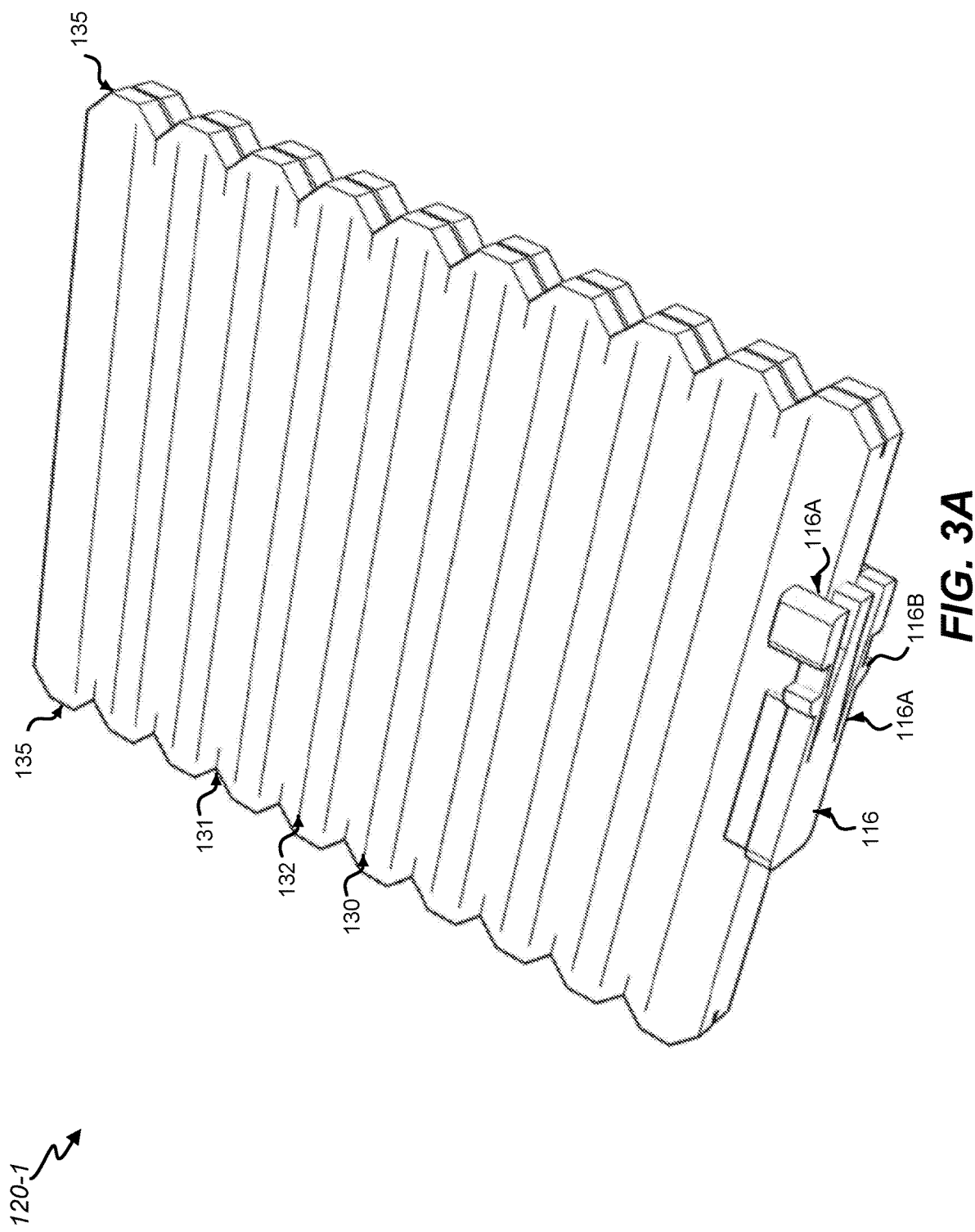
FIGS. 3A and 3B depict close-up views of aspects of the fly box system with the middle page detached, in accordance with certain embodiments of the present disclosure.
Figure 3B:
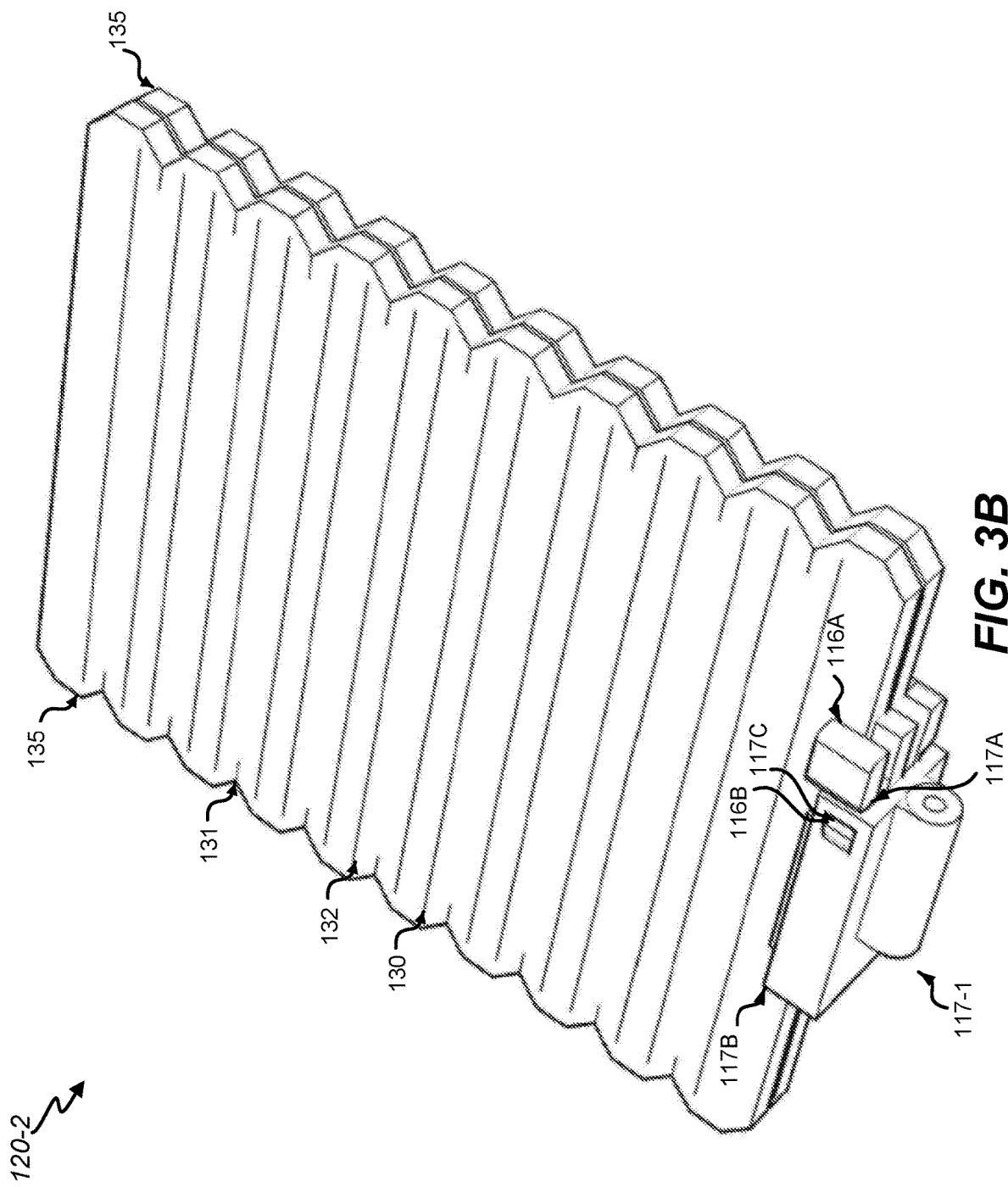

FIGS. 3A and 3B, depict close-up views of aspects of the fly box system 100 with the middle page 120 detached, in accordance with certain embodiments of the present disclosure. In some embodiments, similar to the example depicted, the quick-release fastener 115 may include multiple components that form a joint and a point of articulation about an axis of the hinge assembly 110. As in the example depicted, the quick-release fastener 115 may include an insert component 116 and a channel component 117. With some embodiments, the insertion component 116 may be attached to, or integral with, the middle page 120; with other embodiments, the channel component 117 may be attached to, or integral with, the middle page 120. In the non-limiting examples depicted, FIGS. 3A and 3B illustrate an embodiment where the insertion component 116 is attached to, or integral with, the middle page 120. FIG. 3B shows a perspective view of the channel component 117 when the insert component 116 is mated with the channel component 117. As depicted, the channel component 117 may include one or more sleeve segments 111C, similar to the embodiment of FIG. 5.

Referring to FIGS. 3A and 3B, the channel component 117 may include a channel 117A and retaining lips 117B to receive and retain the insert component 116. The insert component 116 may be formed for insertion into the channel component 117 via an end of the channel 117A and retaining lips 117B to receive and retain the insert component 116. The quick-release fastener 115 may correspond to a snap-fit fastener. For example, the insert component 116 may have one or more flexible members 116A with a lug 116B to mate with an aperture 117C, thereby snap-fitting and locking the insert component 116 (and, hence, the middle page 120) in place in the channel component 117, thus attaching the middle page 120 to the multi-piece enclosure 105. In some embodiments, the lug 116B that snaps into the aperture 117C may be a protrusion (which may be triangle-shaped) adjacent to an end of the respective flexible member 116A. With some embodiments, the end of the respective flexible member 116A may be a larger rectangular part of a beam adapted to provide a way to grasp and press the two beams together in order to release the snap. Accordingly, some embodiments may employ a cantilever snap fit.

In addition, or in alternative, various embodiments of the quick-release fastener 115 may use other means of retaining the middle page 120. For example, the quick-release fastener 115 may include magnetized material to facilitate retention of the middle page 120. All or a portion of the channel component 117 may include magnetized material to attract the insert component 116, which may include a metal that is attracted to magnetized material. Some embodiments of the insert component 116 and/or the channel component 117 may have one or more surfaces configured to stop the insertion of the insert component 116 at a particular point in the channel component 117, such a lip or other surface at an end of the channel 117A, a V-shaped channel 117A and/or insertion component 116, a lip proximate to an end of the insertion component 116, and/or the like.

Referring again to FIG. 1A, according to certain embodiments, the middle page 120 may include a composite sheet assembly 125. The composite sheet assembly 125 may include two or more sheets or layers attached to one another in any suitable manner. For example, the two or more sheets or layers may be affixed with an adhesive, heat-based bonding, etc.

The depicted example of the composite sheet assembly 125 includes three sheets: two exterior sheets 125A, 125B and a middle sheet 125C. In some embodiments, the composite sheet assembly 125 may be formed of one or more lightweight materials. The exterior sheets 125A, 125B may be formed of material including foam, silicone, rubber, cork, and/or any other material suitable to function to receive fishing hooks (and, in some embodiments, to impart forces on fishing hooks to actively grip the fishing hooks) according to various embodiments disclosed herein. With a set of embodiments, the exterior sheets 125A, 125B may be formed of material having no memory characteristics so that the exterior sheets 125A, 125B may have no memory of flies and tippets retained by the composite sheet assembly 125. Such embodiments may be more durable and resistant to wear. Another set of embodiments may have memory characteristics, however.

The middle sheet 125C may be a support layer that reinforces the first sheet 125A and the second sheet 125B. As such, the middle sheet 125C may correspond to a backbone of the middle page 120 to allow for tight wrapping of rigs while preventing or at least mitigating the problem of tippet tearing the first sheet 125A and the second sheet 125B, to protect the first sheet 125A and the second sheet 125B, and to increase structural integrity, rigidity, and resiliency of the middle page 120. Some embodiments of the middle sheet 125C may impart such characteristics to middle page 120 while still allowing the middle page 120 to be flexible.

In some embodiments, the middle sheet 125C may be sandwiched between the first sheet 125A and the second sheet 125B; in other embodiments, the middle sheet 125C may be coupled to a single first sheet 125A. The middle sheet 125C may be formed of material including plastic, silicone, foam, rubber, cork, wood, metal, magnetic materials, within a suitable durometer range. In some embodiments, the composite sheet assembly 125 may be formed of one or more transparent materials so that the middle page 120 may be transparent.

According to certain embodiments, the middle sheet 125C may include magnetized material to attract fishing hooks. In some embodiments, the middle sheet 125C may itself be magnetized. Yet, some embodiments may provide for magnetized material attached to the middle sheet 125C. The magnetized material could be implemented with a plurality of portions included in the middle sheet 125C or affixed thereto and coordinated with the slits 130A, 130B. For example, one or more arrays of magnetic portions may be disposed so that each magnetic portion is adjacent to the slits 130A and/or the slits 130B. The magnetized material may attract fishing hooks placed in the slits 130A and/or the slits 130B. According to some embodiments, the magnetized material in conjunction with gripping forces of the slits 130A and/or the slits 130B may retain the fishing hooks. Such embodiments may provide for enhanced retention of fishing hooks and may mitigate slacking of rigs and loosening of flies. According to other embodiments having no-friction slits 130A and/or the slits 130B, the magnetized material would retain the fishing hooks without the slits 130A and/or the slits 130B imparting gripping forces on the fishing hooks.

Some embodiments of one or both of the exterior sheets 125A, 125B may include one or more slit systems 130. The slit system 130 may include a plurality of slits 130A in the exterior sheet 125A and/or a plurality of slits 130B in the exterior sheet 125B. The slits 130A, 130B may extend into the exterior sheets 125A, 125B to any suitable depth, and, in some embodiments, may extend through the exterior sheets 125A, 125B. As disclosed herein, the slits 130A, 130B may be configured to impart opposing forces and friction to hold flies placed in the slits when the hooks are inserted into the 130A, 130B, thereby holding in place rigs wrapped around the middle page 120. Other embodiments of the slits 130A, 130B may not be configured to impart opposing forces, but may guide placement of the hooks for retention by proximately placed magnetized material. As depicted, the slits 130A, 130B may be positioned in parallel with respect to respect to each other. In some embodiments, two or more slits 130A, 130B may be positioned in-line with respect to respect to each other.

In some embodiments, the middle page 120 may include a notched edge portion 135. As depicted, the middle page 120 may include two opposing notched edge portions 135. Each notched edge portion 135 may include one or more notches configured to receive portions of rig lines when the rig lines are wrapped at least partially around the middle page 120 and, hence, the composite sheet assembly 125. In some embodiments, the opposing notched edge portions 135 may be configured so that at least some of the notches of one notched edge portion 135 are aligned with at least some the notches of the other notched edge portion 135. In other embodiments the opposing notched edge portions 135 may be configured so that the notches of one notched edge portion 135 are not aligned with at least some the notches of the other notched edge portion 135. In some embodiments, the opposing notched edge portions 135 may each have the same number of notches and/or notches with the same dimensions. In other embodiments, the opposing notched edge portions 135 may not each have the same number of notches and/or notches with the same dimensions. Certain embodiments of the slit system may include the slits 130A, 130B being disposed and oriented so that one or more slits of the slits 130A, 130B are aligned with corresponding notches on the notched edge portions 135. With some embodiments, in alternative or in combination, one or more of the slits 130A, 130B and the notches may not be aligned.

As illustrated in FIGS. 3A and 3B, some embodiments may include multiple sets of different slits. Slits 131 may originate at the notches and extend from the notches toward an opposing edge/notch of the page 120. Accordingly, the set of slits 131 may correspond to one type of slit that forms slitted notches. In some embodiments, as in the example illustrated, the slits 131 may not extend completely to the opposing edge/notch of the page 120, but only a limited distance away from the originating notch. In other embodiments, the slits 131 may extend completely to the opposing edge/notch of the page 120. A set of slits 132 may correspond to another type of slit that does not originate at a notch. Instead, the slits 132 may be disposed between notched edge portions 135 without originating at notches.

FIG. 3C depicts a close-up partial view of a middle page 120-3, in accordance with certain embodiments of the present disclosure. The view illustrates one form of the middle page 120-3 with a middle sheet 125C-1. The depicted middle page 120-3 includes an exterior sheet 125A-1 forming a plurality of notches 126. As disclosed herein, an opposing exterior sheet (not shown) may be disposed behind the exterior sheet 125A-1 to sandwich the middle sheet 125C-1 between the two exterior sheets and to conjointly form the plurality of notches 126 with the exterior sheet 125A-1. One or more of the plurality of notches 126 may include a notch slit 127 in one or both of the exterior sheets. The middle sheet 125C-1 may form a second plurality of notches 128 that may be offset from the first plurality of notches 126 of the exterior sheet(s). Each notch slit 127 may be formed to extend to a bottom of a corresponding notch 126. This may allow tippet 129 to be inserted into the notch 126, which may guide the tippet 129 to the notch slit 127, which in turn may guide the tippet 129 to settle into the notch 128. The notch 128 may secure the tippet 129 by friction of the exterior sheet material. The middle sheet 125C-1 may prevent the tippet 129 from tearing into the exterior sheet material as the rig is wrapped around the middle page 120-3. FIG. 3D depicts an example of tearing that may potentially occur with some less resilient exterior sheet materials, absent the middle sheet 125C-1, if the rig is wrapped tightly around the around the middle page 120-3.

Figure 3E:
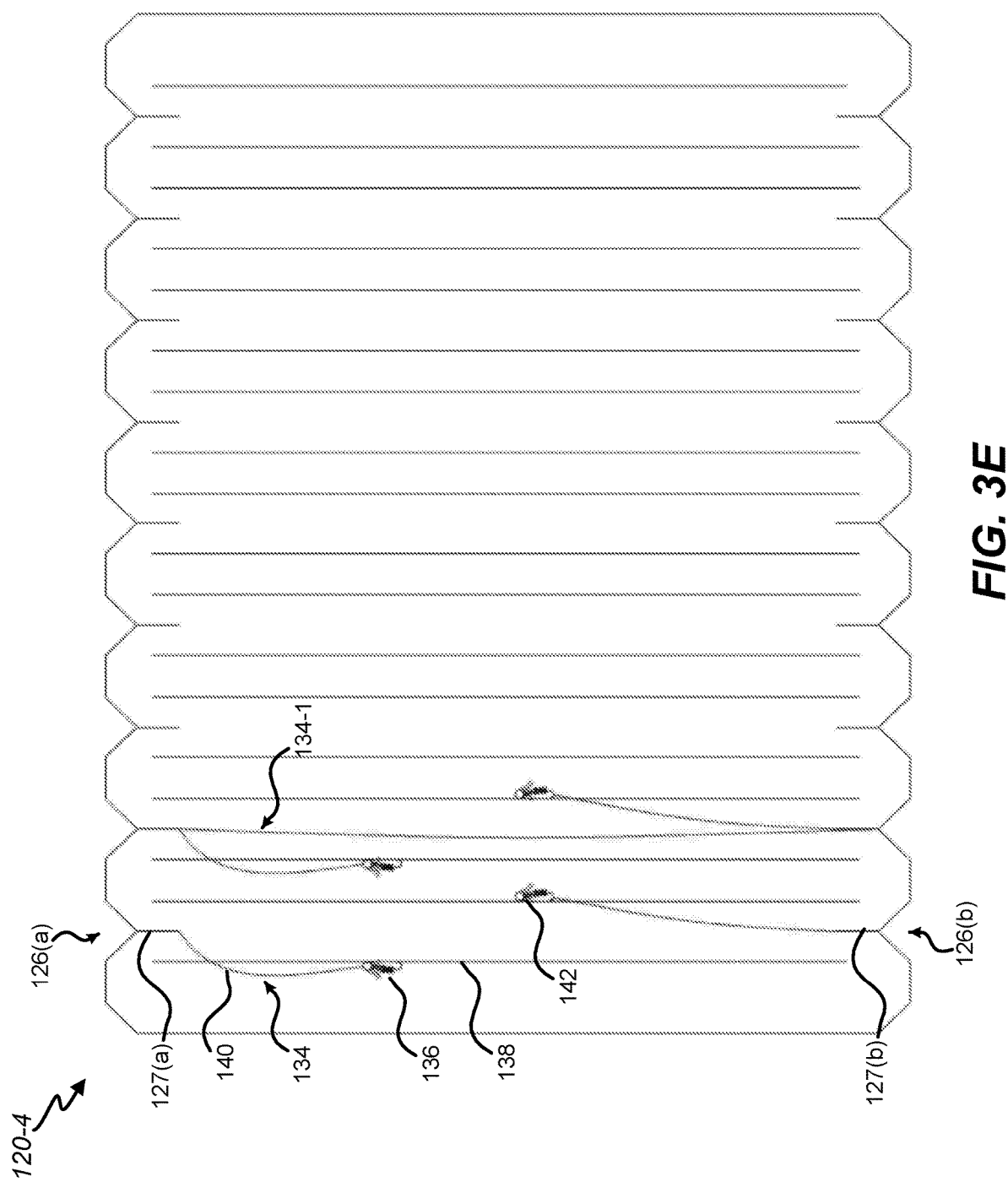
FIG. 3E depicts a partial side view a middle page illustrating securing of two-fly rigs for rig storage, in accordance with certain embodiments of the present disclosure.

FIG. 3E depicts a partial side view a middle page 120-4 illustrating securing of two-fly rigs for rig storage, in accordance with certain embodiments of the present disclosure. To store a first two-fly rig 134 with the middle page 120, a first fly 136 may be inserted into a first slit 138 and may be secured by friction and/or magnetic attraction. Tippet line 140 of the first two-fly rig 134 may be wrapped into a nearby notch 126(*a*) so that the tippet line 140 is guided into a notch slit 127(*a*) of the notch 126(*a*) and secured by the notch slit 127(*a*) with friction. The tippet line 140 may be wrapped around the middle page 120-4 (multiple times, if needed). As in the example depicted, the tippet line 140 may be wrapped into one or more additional notches, such as opposing notch 126(*b*), so that the tippet line 140 is guided into one or more additional notch slits, such as notch slit 127(*b*). The one or more additional notch slits may likewise secure the tippet line 140 with friction. After wrapping the tippet line 140 to a point near a second fly 142 attached to the tippet line 140, the second fly 142 may be inserted into a second slit 144.

A second two-fly rig 134-1 is also depicted. The second two-fly rig 134-1 is secured in like manner to the securing of the first two-fly rig 134 but also demonstrates how a rig with a longer length of tippet connecting the flies may be wrapped around the middle page 120-4 multiple times, as needed.

It may be preferable for the lead fly of a given two-fly rig (to which the tippet line is attached via the eye of the hook, not via the bend of the hook) to correspond to the first fly 136 such that it is inserted into a slit first. Thus, the tail fly 142

(to which the tippet line is attached via the bend of the hook) of the rig may be inserted into a slit last. In this manner, the rig may be easily removed by pulling the tail fly first in order to avoid tangling the coil of tippet as would happen if the lead fly was instead removed first. If, however, the lead fly was pulled first, the two-fly rig may become tangled due to the wraps of tippet attached to the lead fly being under the wraps of tippet connected to the tail fly. Some embodiments may include a visual indicator as a prompt for proper unwrapping of the rig, e.g., to always have tail flies on one particular side of a notch. Some embodiments may have a smaller slit and/or a hole for the lead flies. Some embodiments may have tabs, hooks, or clips extending from a sheet 125A, 125B for hooking lead flies.

Figure 4:
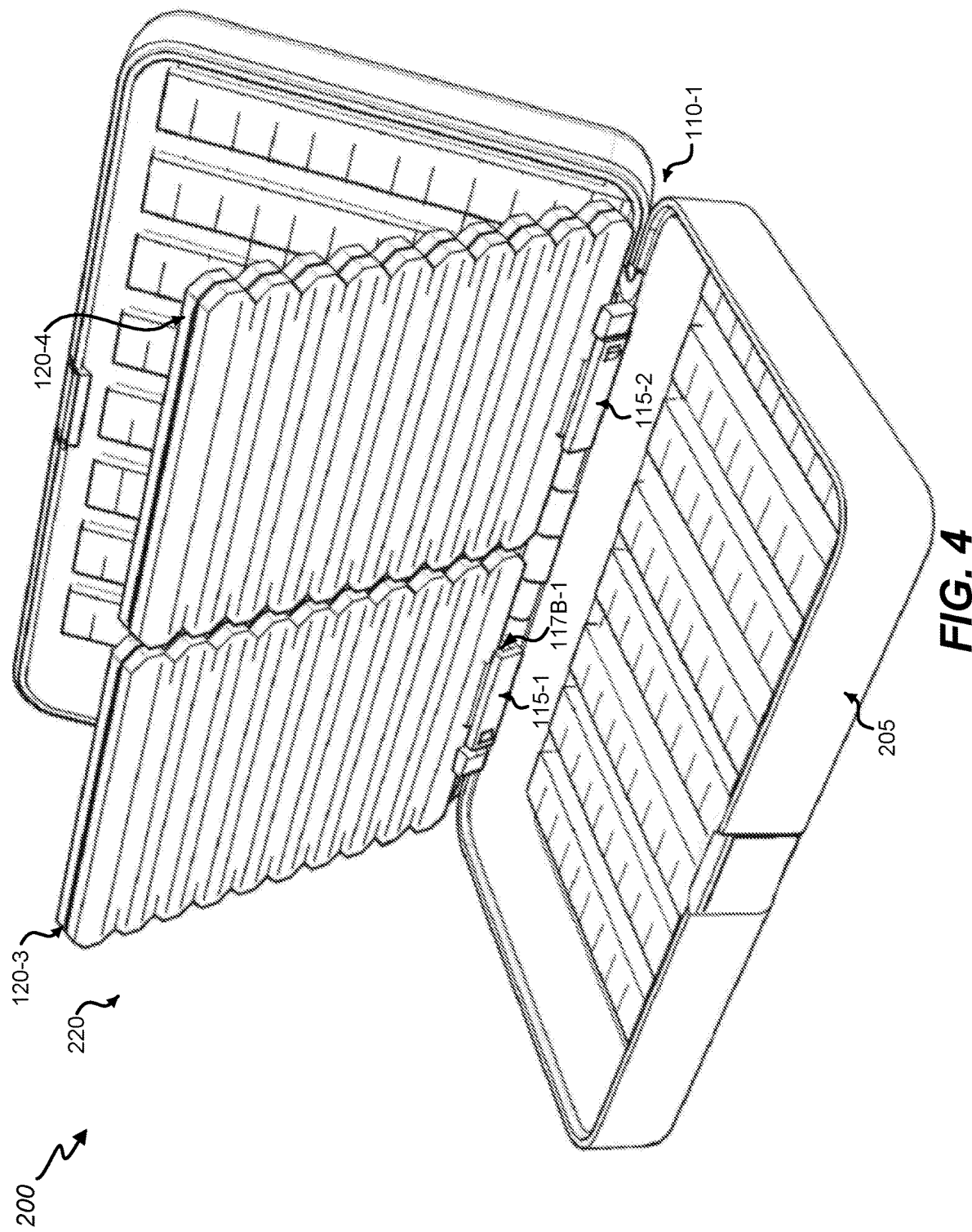
FIG. 4 depicts a perspective view of a multi-page fly box system in an open state, in accordance with certain embodiments of the present disclosure.

FIG. 4 depicts a perspective view of a multi-page fly box system 200 in an open state, in accordance with certain embodiments of the present disclosure. Various embodiments of a multi-page fly box may be configured to allow a tandem middle page configuration 220 accommodated by an elongated multi-piece enclosure 205. Alternative embodiments not shown may include a side-by-side middle page configuration accommodated by a deeper box. The elongated multi-piece enclosure 205 may be dimensioned so that multiple middle pages 120 may fit within the multi-piece enclosure 205 when the middle pages 120 are attached via the quick-release fasteners 115. The example depicted include a two-page configuration where middle pages 120-3, 120-4 are disposed in tandem and pivotally interconnected with the hinge assembly 110-1. Accordingly, each middle page 120-3, 120-4 may be adapted to pivot and detach independently of the other. Other aspects of the multi-page fly box system 200 may be the same or similar to aspects of other embodiments disclosed herein.

FIG. 5 depicts a perspective partial view of a fly box system 300 with an extendable middle page 120-5, in accordance with certain embodiments of the present disclosure. The fly box system 300 may be configured so that the middle page 120-5 may have multiple attachment states. In a first state not shown in FIG. 5, the middle page 120-5 may be pivotally interconnected to the multi-piece enclosure 105 via the quick-release fastener 115-3. As disclosed above, the quick-release fastener 115-3 may be a magnetic fastener, in some embodiments. With various embodiments, the magnetic quick-release fastener 115-3 may include one or more pairs of mating magnetic fastener components. For example, as depicted, the quick-release fastener 115-3 may include a first pair of mating magnetic fastener components 115A, 115B and a second pair of mating magnetic fastener components 115C, 115D.

One component of a pair may be attached to the middle page 120-5; the other component of the pair may be attached to the multi-piece enclosure 105. One or both components of a pair of mating magnetic fastener components may be magnetized. One magnetized component of a pair may attract another magnetized component of the pair and/or the ferromagnetic material of the other component. The quick-release fastener 115 may include a channel component 117-2 similar to that of other embodiments disclosed herein. One or more magnetic fastener components, such as components 115B and 115D, may be seated in the channel component 117-2, as illustrated.

In a second state like that depicted in FIG. 5, the middle page 120-5 may be extendably attached to the multi-piece enclosure 105 via a cable system 318. Once the quick-release fastener 115 is in the detached state, the middle page 120-5 may yet be attached to the multi-piece enclosure 105 via a cable 319 of the cable system 318 that may be connected to an anchor 320 of the cable system 318 that is in turn attached to the middle page 120-5. The cable system 318 may allow the middle page 120-5 to extend from the multi-piece enclosure 105 any suitable predetermined distance. Some embodiments of the cable system 318 may be configured with a tensioner 321 to maintain various amounts of tension on a cable 319 of the cable system 318 when the cable 319 is extended away from an enclosure of the tensioner 321. In this manner, slack in the cable may be avoided.

Some embodiments of the cable system 318 may be configured with a retractor such as a spring mechanism that allows the cable 319 to automatically retract the cable 319 to bring the middle page 120-1 and the multi-piece enclosure 105 together when either the middle page 120-1 or the multi-piece enclosure 105 is released (e.g., when the angler let's go of the middle page 120-1) and when tension on the cable 319 is less than a threshold (e.g., when the angler gradually decreases tension on the cable 319 by bringing the middle page 120-1 toward the multi-piece enclosure 105). As the middle page 120-5 is moved toward the channel component 117-2, the channel component 117-2 may be adapted to guide one or more corresponding magnetic fastener components, such as components 115A and 115C, along with the middle page 120-5 into mating abutment with components 115B and 115D when the attracting components of a pair are in close proximity. Some embodiments of the cable system 318 may be configured to retract the cable 319 at the push of a button, adjustment of a lever arm, and/or another activation mechanism. Thus, certain embodiments may not maintain tension on the cable 319 at all times, but only when the retractor is activated.

Figure 6A:
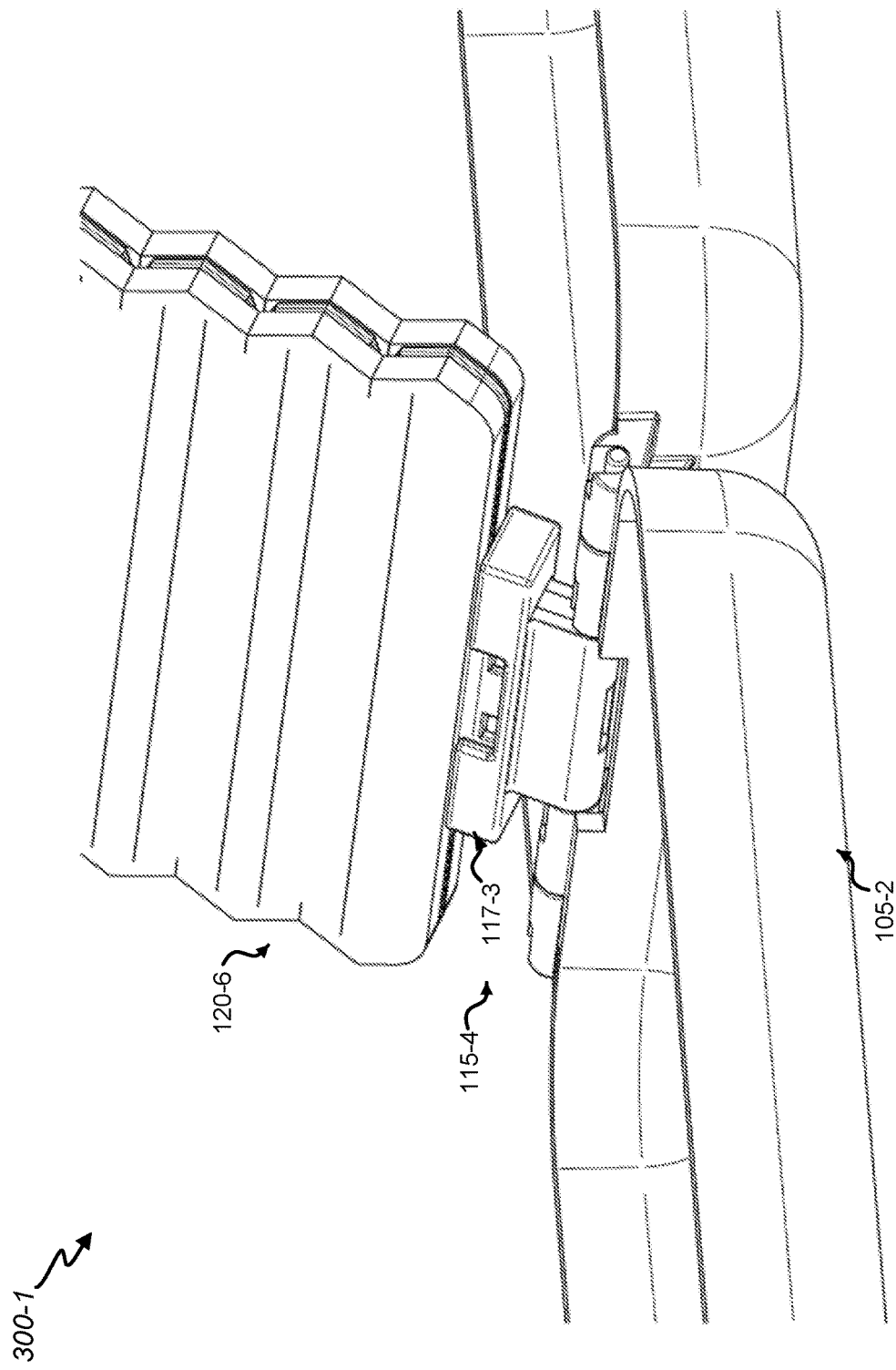
FIGS. 6A and 6B depict perspective partial views of a fly box system with a magnetic quick-release fastener, in accordance with certain embodiments of the present disclosure.
Figure 6B:
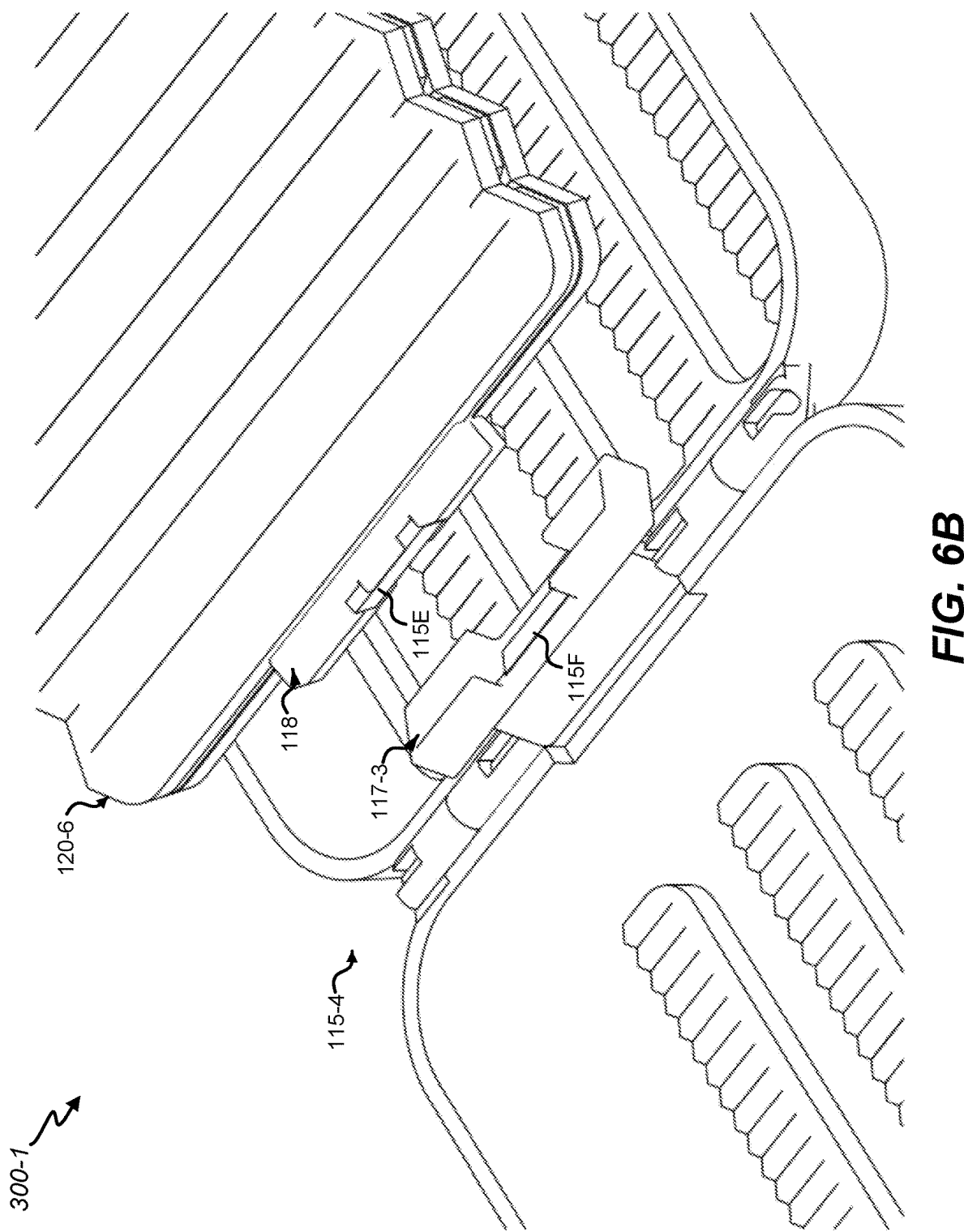

FIGS. 6A and 6B depict perspective partial views of a fly box system 300-1 with a magnetic quick-release fastener 115-4, in accordance with certain embodiments of the present disclosure. In FIG. 6A, the middle page 120-6 is depicted as pivotally interconnected to the multi-piece enclosure 105 via the quick-release fastener 115-4. In FIG. 6B, the middle page 120-6 is depicted in a detached state with respect to the multi-piece enclosure 105.

Like the quick-release fastener 115-3, the magnetic quick-release fastener 115-4 may be a magnetic fastener that includes at least one pair of mating magnetic fastener components. For example, as depicted, the quick-release fastener 115-4 may include a single pair of mating magnetic fastener components 115E, 115F. One or both components of a pair of mating magnetic fastener components may be magnetized. One magnetized component of a pair may attract another magnetized component of the pair and/or the ferromagnetic material of the other component.

The quick-release fastener 115-4 may include a channel component 117-3 similar to that of other embodiments disclosed herein. As depicted, the magnetic fastener components 115E, 115F may be seated in the channel component 117-3. The quick-release fastener 115-4 may include an extension 118, to which the magnetic fastener components 115E may be attached. The extension 118 may be formed to matingly engage the channel component 117-3. In the engaged state, walls of the channel component 117-3 may limit or prevent movement of the extension 118 with respect to the channel component 117-3 along two axes.

The methods, systems, and devices discussed above are examples. Various configurations may omit, substitute, or add various procedures or components as appropriate. Features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

While the principles of the disclosure have been described above in connection with specific apparatuses and methods, it is to be clearly understood that this description is made only by way of example and not as limitation on the scope of the disclosure.

What is claimed is:

1. A storage system to retain fishing flies and fishing rigs, the storage system comprising:
   a multi-piece enclosure comprising:
      a first storage compartment; and
      a second storage compartment pivotally interconnected with the first storage compartment; and
   a composite sheet assembly attachable to the multi-piece enclosure, the composite sheet assembly:
      pivotally interconnected with the first storage compartment and the second storage compartment;
      sized to fit within the multi-piece enclosure when attached to the multi-piece enclosure and when a first edge portion of the first storage compartment and a second edge portion of the second storage compartment are positioned against one another;
      comprising a notched edge comprising a set of notches to receive portions of rig lines when the rig lines are wrapped at least partially around the composite sheet assembly;
      comprising a first sheet attached to a second sheet, wherein the first sheet comprises a slit system comprising a plurality of slits in the first sheet, each slit of the plurality of slits extending from a respective notch of the set of notches so that the respective notch corresponds to a slitted notch adapted to direct a fly of a first rig line of the rig lines to a slit of the plurality of slits; and
      is sized to fit within the multi-piece enclosure when attached to the multi-piece enclosure.

2. The storage system to retain fishing flies and fishing rigs of claim 1, further comprising:
   a quick-release fastener pivotally interconnected with the first storage compartment and the second storage compartment, wherein the composite sheet assembly is attachable to the multi-piece enclosure via the quick-release fastener.

3. The storage system to retain fishing flies and fishing rigs of claim 2, wherein:
   the composite sheet assembly further comprises a third sheet attached to the second sheet, the third sheet comprising a second slit system that comprises a second plurality of slits in the third sheet and that is configured to retain fishing hooks in the second plurality of slits; and
   the second sheet adds a structural integrity to the composite sheet assembly at least in part by reinforcing the first sheet and the third sheet, wherein the second sheet further at least mitigates tearing of the first sheet and the third sheet.

4. The storage system to retain fishing flies and fishing rigs of claim 3, wherein the first sheet is configured to retain fishing hooks at least in part with forces imparted on the fishing hooks by the plurality of slits.

5. The storage system to retain fishing flies and fishing rigs of claim 3, wherein at least a portion of the second sheet comprises magnetic material, and the magnetic material at least partially facilitates retaining of the fishing hooks in the plurality of slits.

6. The storage system to retain fishing flies and fishing rigs of claim 5, wherein the magnetic material is formed as one or more magnetic members disposed proximately to the plurality of slits, the one or more magnetic members to at least partially facilitate retaining of the fishing hooks in the plurality of slits.

7. A storage system to retain fishing flies and fishing rigs, the storage system comprising:
   a multi-piece enclosure comprising:
      a first storage compartment; and
      a second storage compartment pivotally interconnected with the first storage compartment about an axis; and
   a middle page attachable to the multi-piece enclosure via the quick release fastener, the middle page:
      comprising a composite sheet assembly, the composite sheet assembly comprising a first sheet attached to a second sheet;
      sized to fit within the multi-piece enclosure when a first edge portion of the first storage compartment and a second edge portion of the second storage compartment are positioned against one another;
      configured to receive and retain fishing hooks;
      comprising a notched edge on part of a periphery of the middle page and substantially perpendicular to the axis, the notched edge comprising a first set of notches to receive portions of rig lines when the rig lines are wrapped at least partially around the middle page; and
      wherein the first sheet comprises a slit system that comprises a plurality of slits, each slit of the plurality of slits extending from a respective notch of the first set of notches so that the respective notch corresponds to a slitted notch adapted to direct a fly of a first rig line of the rig lines to a slit of the plurality of slits.

8. The storage system to retain fishing flies and fishing rigs of claim 7, wherein the middle page is configured to retain fishing hooks in the plurality of slits.

9. The storage system to retain fishing flies and fishing rigs of claim 7, further comprising:
   a quick-release fastener pivotally interconnected with the middle page, wherein the quick-release fastener corresponds to a snap clip, a magnetic fastener, a press fit fastener, or a hook and loop fastener.

10. The storage system to retain fishing flies and fishing rigs of claim 7, further comprising:
a retractable cable mechanism that comprises a reel and a cable, the cable attached to the reel and the middle page.

11. The storage system to retain fishing flies and fishing rigs of claim 8, wherein the slit system comprises a second plurality of slits, each slit of the second plurality of slits extending from a respective notch of a second set of one or more notches so that the respective notch corresponds to a slitted notch adapted to direct a fly of a first rig line of the rig lines to a slit of the second plurality of slits.

12. The storage system to retain fishing flies and fishing rigs of claim 9, further comprising:
a second quick-release fastener pivotally interconnected with the first storage compartment and the second storage compartment; and
a second middle page attachable to the multi-piece enclosure via the second quick-release fastener, the second middle page sized to fit within the multi-piece enclosure when attached via the second quick-release fastener and when the first edge portion of the first storage compartment and the second edge portion of the second storage compartment are positioned against one another;
wherein the second middle page comprises:
a second slit system comprising a second plurality of slits and configured to retain fishing hooks in the second plurality of slits; and
a second notched edge comprising a second set of one or more notches to receive portions of rig lines when the rig lines are wrapped at least partially around the second middle page.

13. The storage system to retain fishing flies and fishing rigs of claim 12, wherein the middle page with the quick-release fastener and the second middle page with the second quick-release fastener are configured to be coaxially rotatable about an axis of a hinge assembly.

14. The storage system to retain fishing flies and fishing rigs of claim 13, wherein the middle page and the second middle page are rotatable to be positioned along a common plane.

15. The storage system to retain fishing flies and fishing rigs of claim 8, wherein the slit system is configured to retain fishing hooks at least in part with forces imparted on the fishing hooks by the plurality of slits.

16. The storage system to retain fishing flies and fishing rigs of claim 8, wherein at least a portion of the middle page comprises magnetic material, and the magnetic material at least partially facilitates retaining of the fishing hooks in the plurality of slits.

17. The storage system to retain fishing flies and fishing rigs of claim 8, further comprising:
one or more magnetic members disposed proximately to the plurality of slits, the one or more magnetic members to at least partially facilitate retaining of the fishing hooks in the plurality of slits.

18. A method for forming a storage system to retain fishing flies and fishing rigs, the method comprising:
interconnecting a first storage compartment with a second storage compartment to provide a multi-piece enclosure so that the second storage compartment pivotally interconnected with the first storage compartment about an axis; and
attaching a middle page to the multi-piece enclosure, the middle page sized to fit within the multi-piece enclosure when a first edge portion of the first storage compartment and a second edge portion of the second storage compartment are positioned against one another;
wherein the middle page comprises:
a composite sheet assembly, the composite sheet assembly comprising a first sheet attached to a second sheet;
a slit system comprising a plurality of slits in one or more sheets and configured to retain fishing hooks in the plurality of slits; and
a notched edge on part of a periphery of the middle page and substantially perpendicular to the axis, the notched edge comprising a set of notches to receive portions of rig lines when the rig lines are wrapped at least partially around the middle page; and
wherein the first sheet comprises a slit system that comprises a plurality of slits, each slit of the plurality of slits extending from a respective notch of the set of notches so that the respective notch corresponds to a slitted notch adapted to direct a fly of a first rig line of the rig lines to a slit of the plurality of slits.

\* \* \* \* \*